Patented July 18, 1933

1,918,599

UNITED STATES PATENT OFFICE

GEORGE W. HERBEIN, OF SAN FRANCISCO, CALIFORNIA

ARTIFICIAL DRYING OIL

No Drawing.    Application filed June 5, 1929.   Serial No. 368,737.

This invention relates to drying oils as used principally by painters, and has for its objects an artificial drying oil which will have properties very much like linseed oil, but which will be very much cheaper.

The main ingredients of my artificial drying oil are rosin, animal fat, mineral oil and certain chemicals all combined under a relatively high heat of about 500° F. and which causes the ingredients to react so that upon cooling a permanent clear reddish oil, of about the consistency of linseed oil results. This oil is of good flowing qualities, miscible in all proportions with various oil paints, and dries with a tough weather-resisting film fully equal to a linseed oil film.

The proportions of the ingredients used in making the oil may vary within reasonable limits, though a satisfactory formula is as follows:—

|  | Pounds |
|---|---|
| Rosin, about | 25 |
| Animal fat, about | 12 |
| Lubricating oil, about | 3 |
| Cobalt acetate | ¼ to 3 |
| Litharge | 2 to 10 |
| Water, about | 2 |
| Stove oil, about | 65 |

The ingredients (with the exception of the stove oil) are thoroughly mixed and heated to about 480° F. and then cooled, the stove oil being added and mixed after turning off the fire. The temperature range which will cause the desired reaction has been found to lie between 300 to 550° F. but the lower temperatures must be maintained for a longer time and the higher ones have a tendency to drive off too much of the lighter constituents, whereas with the mass brought up to 480° F. the reaction is complete and the oil may be quickly cooled, the addition of the relatively large quantity of cold stove oil being effective to quickly lower the temperature.

The animal fat used is preferably beef tallow, though other tallows, lard, oil and wool grease, have been found satisfactory, as well as fish oil, cottonseed and cocoanut oil, and wax.

The lubricating oil of the formula is a mineral oil of about 32° Baumé, but a gravity from 30 to 40° Baumé will answer.

The stove oil is also a mineral oil but of a gravity running from 30 to 40° Baumé, bleached or unbleached, or its equivalent.

Other acetates such as manganese and lead acetates may be used in place of the cobalt salt, but the latter seems to produce the best result. Also mixed acetates of manganese and cobalt may be used as the dryer.

Likewise, other oxides such as lead peroxide, sodium oxide or lime oxide, may be used in place of the litharge, though the litharge is preferred.

In localities where linseed oil is relatively cheap it may be used to displace the lubricating oil of the formula. Also a small quantity of melted or dissolved rubber up to about one per cent of the mass, may be incorporated to increase slightly the elasticity of the film.

I am aware that many formulas have been worked out for the production of artificial drying oils, but I do not know of any combining my high heat treatment with a line of ingredients of the general nature disclosed which include rosin, an animal fat and non-drying oils and which combination yields an artificial drying oil comparing in every respect with natural linseed oil.

I claim:

1. The method of making an artificial drying oil which comprises reacting rosin, animal fat, mineral oil and a metal oxide together at a temperature between 300 and 550° Fahrenheit.

2. The method of making an artificial drying oil which comprises reacting rosin, a relatively non-drying fat, mineral oil, water and a metal oxide together at a temperature between 300 and 550° Fahrenheit.

3. The method of making an artificial drying oil which comprises reacting rosin, animal fat, mineral oil, water and a metal oxide together at a temperature of about 480° Fahrenheit.

4. An artificial drying oil containing rosin, animal fat, mineral oil, cobalt acetate and litharge, all chemically combined.

5. An artificial drying oil comprising the heat treated reaction product of water, rosin, animal fat, mineral oil of 30° to 40° Baumé, a metal oxide and a metal acetate.

6. An artificial drying oil comprising the heat treated reaction product of water, substantially 25 parts by weight of rosin, 12 parts tallow, between 40 and 80 parts of mineral oil of 30° to 40° Baumé, between 1 and 6 parts of mixed metal acetate and oxide, and of melted rubber up to about 1% of the mass.

7. An artificial drying oil comprising the heat treated reaction product of water, rosin, animal fat, mineral oil of 30° to 40° Baumé, a metal oxide and melted rubber.

GEORGE W. HERBEIN.